United States Patent [19]
O'Loughlin et al.

[11] Patent Number: 5,582,426
[45] Date of Patent: Dec. 10, 1996

[54] VENTED IGNITION CUP IN STORED FLUID INFLATOR

[75] Inventors: John P. O'Loughlin; Xiaogang Leng, both of Mesa; James R. Hocking, Chandler, all of Ariz.

[73] Assignee: TRW Vehicle Safety Systems Inc., Lyndhurst, Ohio

[21] Appl. No.: 547,897

[22] Filed: Oct. 24, 1995

[51] Int. Cl.⁶ .................................................. B60R 21/26
[52] U.S. Cl. ........................... 280/741; 280/737; 280/736
[58] Field of Search .................................... 280/737, 736, 280/741; 102/530, 531, 202, 202.14; 222/3.5; 422/164–167

[56] References Cited

U.S. PATENT DOCUMENTS

| | | | |
|---|---|---|---|
| 3,966,225 | 6/1976 | Marlow | 280/737 |
| 5,076,607 | 12/1991 | Woods et al. | 280/737 |
| 5,131,680 | 7/1992 | Coultas et al. | 280/737 |
| 5,184,846 | 2/1993 | Goatz | 280/736 |
| 5,273,312 | 12/1993 | Coultas et al. | 280/737 |
| 5,350,192 | 9/1994 | Blumenthal | 280/737 |
| 5,467,307 | 10/1995 | Weller et al. | 280/737 |
| 5,516,147 | 5/1996 | Clark et al. | 280/737 |

FOREIGN PATENT DOCUMENTS 2264772  9/1993  United Kingdom .

*Primary Examiner*—Christopher P. Ellis
*Attorney, Agent, or Firm*—Tarolii, Sundheim, Covell, Tummino & Szabo

[57] ABSTRACT

An apparatus (20, 320) for inflating an inflatable vehicle occupant protection device comprises a container (22, 340) which defines a chamber (44, 348) for storing inflation fluid under pressure. The container (22, 340) has an opening (60, 360) through which the inflation fluid flows to inflate the protection device. A rupturable closure (102, 402) extends across the opening (60, 360) to block the flow of inflation fluid. A flow initiator (120, 322) is located in the chamber (44, 348) and is spaced from the closure (102, 402). The flow initiator (120, 322) comprises an ignition cup (122, 440) having a base section (142, 442) fixed to the container (22, 340). A movable section (146, 446) of the ignition cup (122, 440) is attached to the base section (142, 442) and is separable from the base section. The movable section (146, 446) has a vent (162, 464) which permits communication of the inflation fluid in the chamber (44, 348) with the interior of the ignition cup (122, 440). An ignitable propellant (168, 482) is located in the ignition cup (122, 440). An actuatable igniter (222, 520), upon actuation, ignites the propellant (168, 482) to produce combustion products (CP), including heat and pressure. The pressure acts on interior surfaces of the movable section (146, 446) to separate the movable section from the base section (142, 442) and propel the movable section to rupture the closure (102, 402).

18 Claims, 4 Drawing Sheets

VENTED IGNITION CUP IN STORED FLUID INFLATOR

BACKGROUND OF THE INVENTION

1. Technical Field

The present invention relates to an apparatus for inflating an inflatable vehicle occupant protection device, such as an air bag.

2. Description of the Prior Art

Inflators for inflating air bags are known. One type of inflator includes a housing which defines a chamber for storing an inflation fluid under pressure. The housing has an opening through which the inflation fluid can flow to inflate an air bag. A rupturable burst disk is fixed to the housing and extends across the opening. The burst disk initially blocks the flow of the inflation fluid from the chamber through the opening. The burst disk may be ruptured in several ways.

SUMMARY OF THE INVENTION

The present invention is directed to an apparatus for inflating an inflatable vehicle occupant protection device, such as an air bag. The apparatus comprises a container which defines a chamber for storing inflation fluid under pressure. The container has an opening through which the inflation fluid can flow to inflate the protection device. A rupturable closure extends across the opening to block the flow of inflation fluid through the opening. A flow initiator is located in the chamber and is spaced from the closure. The flow initiator includes an ignition cup having a base section fixed to the container and a movable section attached to the base section. The movable section is separable from the base section.

A vent is located in the movable section of the ignition cup. The vent permits communication of the inflation fluid in the chamber with the interior of the ignition cup. An ignitable propellant is located in the ignition cup. An actuatable igniter, upon actuation, ignites the propellant to produce combustion products, including heat and pressure. The pressure of the combustion products acts on interior surfaces of the movable section of the ignition cup to separate the movable section from the base section and propel the movable section to engage and rupture the closure. The heat of the combustion products is released into the chamber to heat and thus pressurize the inflation fluid.

The vent is located in an end portion of the movable section of the ignition cup. The vent is large enough to permit equalization of the inflation fluid pressure in the chamber and in the interior of the ignition cup over a time interval. The vent is small enough to allow a pressure increase inside the ignition cup, upon ignition of the propellant, that is sufficient to separate the movable section from the base section. The base section and the movable section of the ignition cup are tubular and coaxial. The movable section has a first radial extent and the base section has a second radial extent. The second radial extent is greater than the first radial extent.

A diffuser is fixed to the container. The diffuser surrounds the opening in the container. The movable section of the ignition cup is propelled through the closure and the opening. The movable section strikes the diffuser to limit movement of the movable section in one direction. Since inflation fluid is stored in the ignition cup, the volume of the chamber for storing inflation fluid may be minimized. Also, since the vent allows the pressure of the inflation fluid acting on interior and exterior surfaces of the ignition cup to equalize, the walls of the ignition cup may be relatively thin and lightweight.

BRIEF DESCRIPTION OF THE DRAWINGS

Further features and advantages of the present invention will become apparent to those skilled in the art to which the present invention relates from reading the following specification with reference to the accompanying drawings, in which.

DESCRIPTION OF PREFERRED EMBODIMENTS

Figure 1:
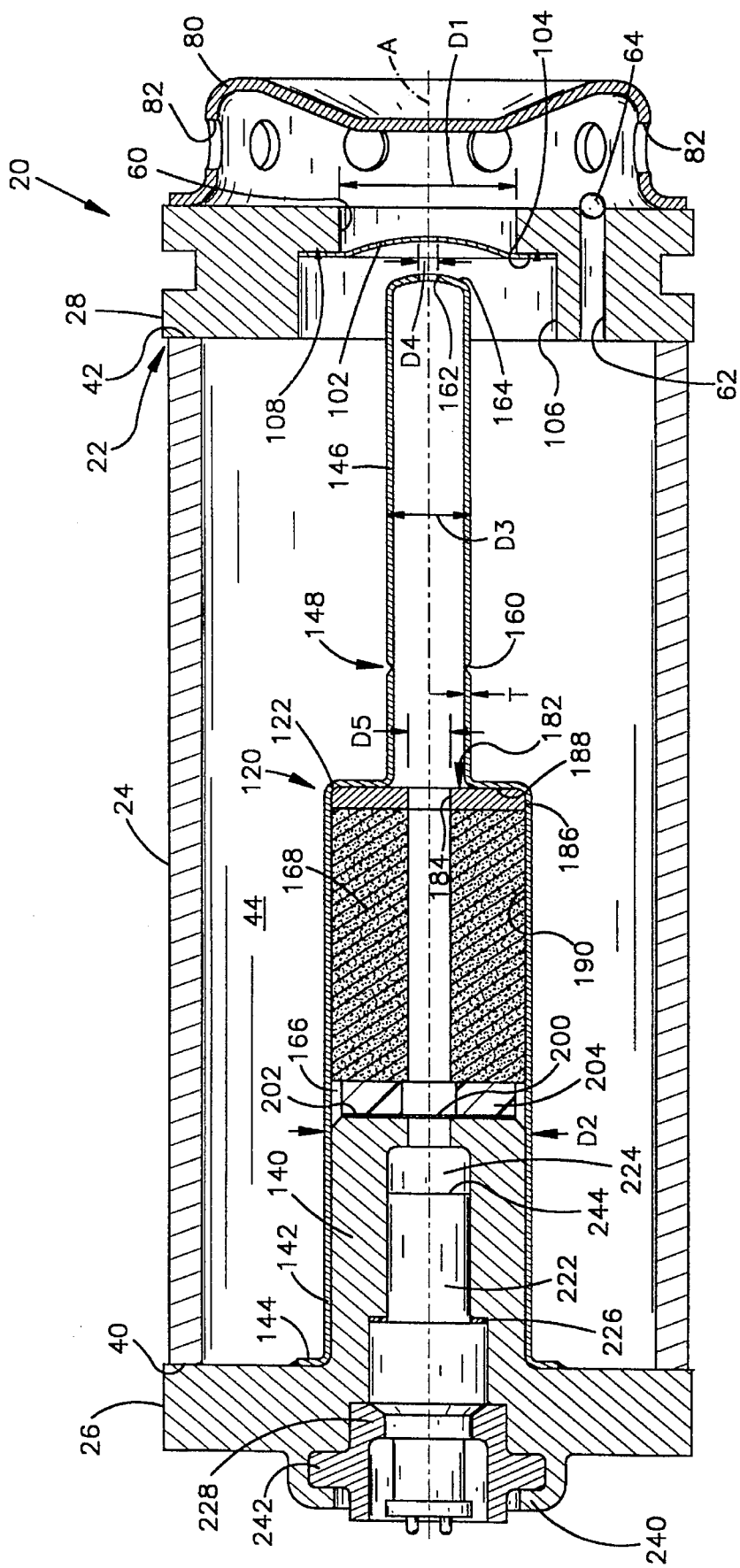
FIG. 1 is a schematic view of an inflator embodying the present invention.
Figure 2:
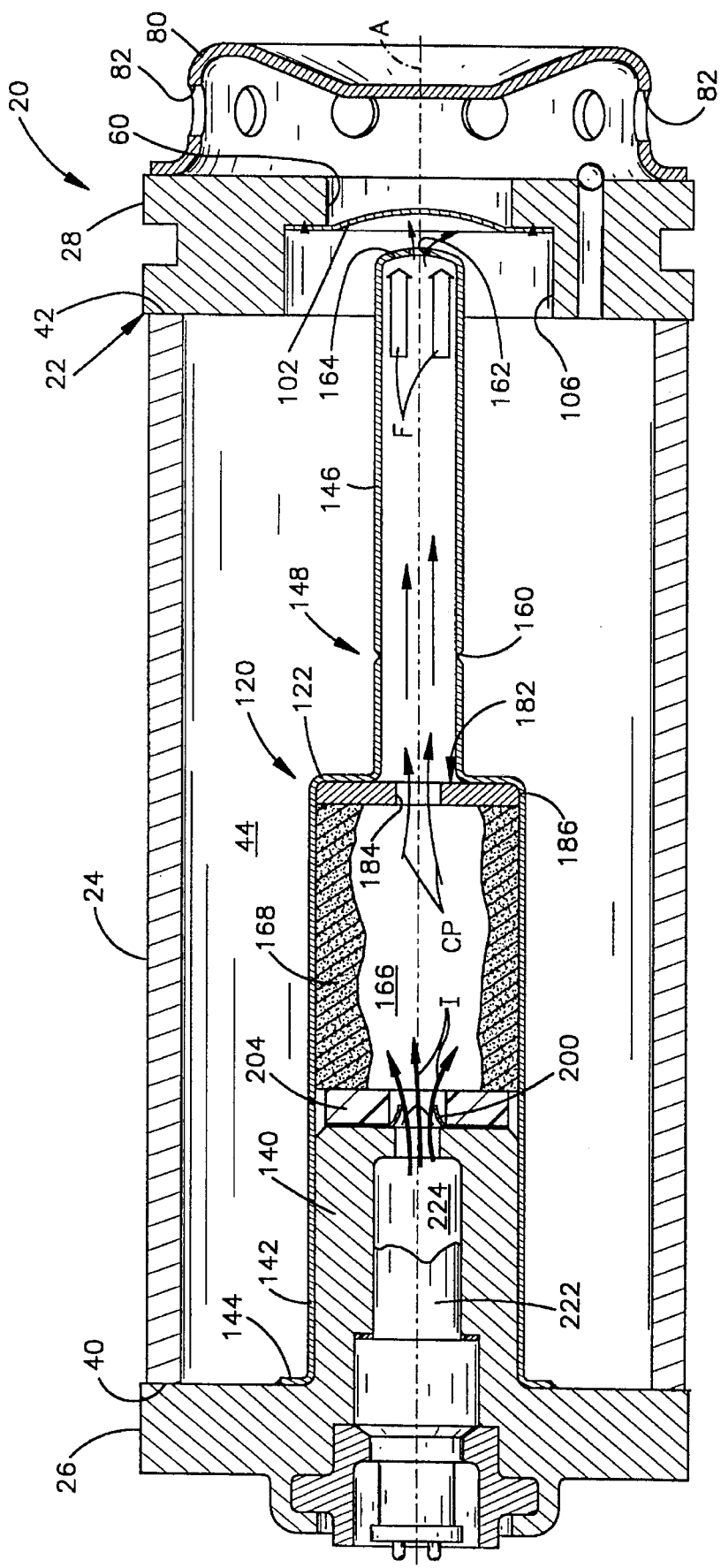
FIGS. 2 and 3 are views similar to FIG. 1 with parts of the inflator illustrated in different positions.
Figure 3:
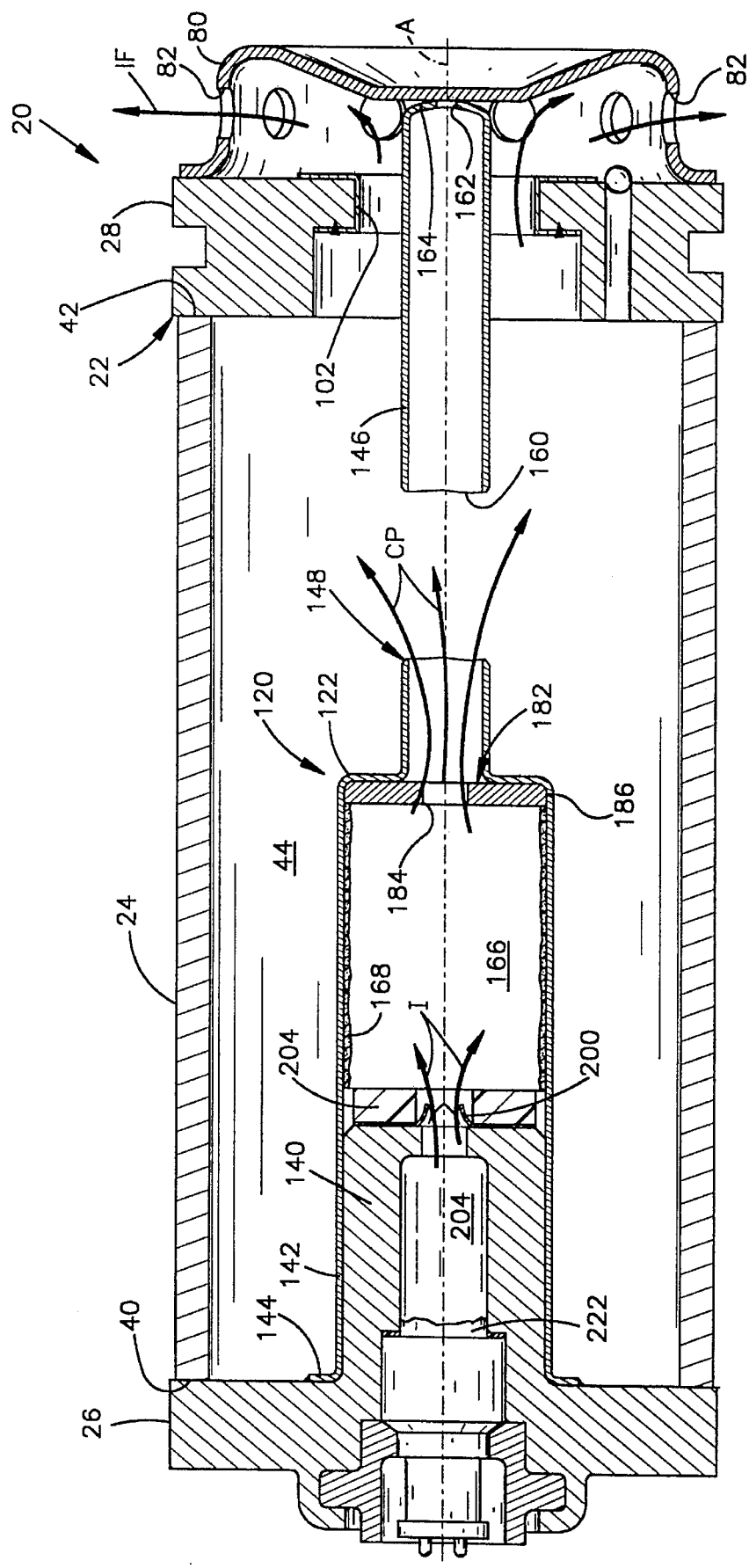

An inflator 20, according to one embodiment of the present invention, is illustrated in FIGS. 1–3. The inflator 20 provides inflation fluid for inflating an inflatable vehicle occupant protection device. Preferably, the inflator 20 is actuatable to inflate an air bag (not shown). The inflator 20 may be mounted in any desired location in a vehicle, such as a steering wheel, an instrument panel or dashboard, a door or a side of a vehicle. The air bag is in fluid communication with the inflator 20.

The inflator 20 includes a cylindrical container 22 with a longitudinal central axis A. The container 22 includes a metal tube 24 and a pair of metal end walls 26, 28. The end wall 26 is fixed to a left end surface 40 of the tube 26 by a friction weld. The end wall 28 is fixed to a right end surface 42 of the tube 24 by a friction weld.

The tubular housing 24 and the end walls 26, 28 cooperate to define a chamber 44 for receiving and storing an inflation fluid to inflate the air bag. The inflation fluid is stored in the chamber 44 of the container 22 at a pressure which is at least about 2,000 psi, and preferably about 4,500 psi. The inflation fluid preferably is an inert gas, such as argon or nitrogen, or a combination of inert gases.

An opening 60 extends through the right end wall 28 of the container 22. The opening 60 is circular with a center located on the axis A of the container 22. The opening 60 has a diameter D1. The inflation fluid flows from the chamber 44 through the opening 60 to inflate the air bag.

A fill port 62 also extends through the right end wall 28 of the container 22 at a location radially spaced from the opening 60. Inflation fluid is introduced into the chamber 44 through the fill port 62. A ball member 64 closes the fill port 62 and is welded to the right end wall 28 after the chamber 44 is filled with inflation fluid.

A cup-shaped diffuser 80 is welded to the right end wall 28 and surrounds the opening 60. The diffuser 80 includes a plurality of circular openings 82 arranged in a circumferential array. The openings 82 direct the flow of inflation fluid radially outward from the diffuser 80 toward the air bag. It will be apparent that the openings 82 can be of any suitable shape, size and arrangement in the diffuser 80.

A closure 102 is fixed to an annular surface 104 of a recess 106 in the right end wall 28. The recess 106 surrounds the opening 60 in the container 22. The closure 102 is attached to the annular surface 104 by a weld 108 which extends continuously around the opening 60 and forms a fluid seal.

The closure 102 initially blocks the flow of inflation fluid from the chamber 44 through the opening 60. The closure 102 is rupturable to allow the flow of inflation fluid from the chamber 44 through the opening 60. The closure 102 may rupture in response to the pressure of the inflation fluid in the chamber 44 increasing to a predetermined pressure which is greater than the pressure at which the inflation fluid is stored.

The closure 102 will also rupture when struck by a movable part of a flow initiator 120 which is located inside the chamber 44 at the left end of the container 22, as viewed in FIG. 1. The flow initiator 120 is actuatable in response to a condition being detected which requires inflation of the air bag. Upon actuation, the flow initiator 120 causes the closure 102 to rupture and heats the inflation fluid in the chamber 44. Heating the inflation fluid in the chamber 44 increases the pressure of the inflation fluid.

The flow initiator 120 is supported by the left end wall 26 of the container 22 and is spaced from the closure 102. The left end wall 26 has a tubular mounting portion 140 located along the axis A of the container 22. The mounting portion 140 projects rightward into the chamber 44 and has an annular, radially extending end surface 202 at its right end.

The flow initiator 120 includes an ignition cup 122. The ignition cup 122 is supported on the mounting portion 140 of the left end wall 26 and is centered on the axis A of the container 22. The longitudinal central axis of the ignition cup 122 is coaxial with the axis A of the container 22. The ignition cup 122 is preferably made from a drawn stainless steel or low carbon steel material and has a substantially uniform thickness T of no greater than about 0.040 inch (1.0 mm), and preferably approximately 0.020 inch (0.5 mm).

The ignition cup 122 includes a tubular base section 142 which is received over the mounting portion 140 for lateral support. A flange 144 extends radially outward from an end of the base section 142 and is welded to the left end wall 26. The ignition cup 122 also includes a tubular movable section 146 connected to the base section at a frangible section 148. The frangible section 148 of the ignition cup 122 has a circumferentially extending stress riser 160. The stress riser 160 is a thin wall portion of the ignition cup 122 which extends circumferentially around the ignition cup 122.

The base section 142 of the ignition cup 122 has an outer diameter D2 (FIG. 1) throughout most of its length, measured normal to the longitudinal central axis of the ignition cup. Near the movable section 146, however, the base section 142 has a shoulder 188 that extends radially inward to a smaller diameter portion of the base section with an outer diameter D3. The movable section 146 also has an outer diameter D3, measured normal to the longitudinal central axis of the ignition cup, and which is less than the outer diameter D2 of the base section 142. The outer diameter D3 of the movable section 146 is less than the diameter D1 of the opening 60. Preferably, the outer diameter D3 of the movable section 146 is no greater than one-half the diameter of D1 of the opening 60.

A vent opening 162 is located in a radially extending end wall 164 of the movable section 146. The vent opening 162 is circular and has a center located on the axis A. The vent opening 162 has a diameter D4. The diameter D4 of the vent opening 162 is in the range of about 0.040 inch (1 mm) to about 0.200 inch (5 mm), and is preferably about 0.080 inch (2 mm). The vent opening 162 allows fluid communication between the interior and exterior of the ignition cup 122. Thus, the pressure of the inflation fluid in the chamber 44 acting on internal and external surfaces of the ignition cup 122 can equalize.

The flow initiator 120 includes a combustion chamber 166 which is located primarily in the base section 142 of the ignition cup 122 between the end surface 202 of the mounting portion 140 and the shoulder 188 of the base section. An ignitable propellant 168, such as potassium perchlorate, is located in the combustion chamber 166 of the base section 142. The propellant 168 is tubular and, upon ignition, produces combustion products CP (FIG. 2), including heat and pressure. The flow initiator 120 also includes an annular metal retainer 182 which holds the ignitable propellant 168 in position in the base section 142 of the ignition cup 122. The retainer 182 engages the annular shoulder 188 of the base section 142 of the ignition cup 122.

A circular opening 184 is located centrally in the retainer 182. The center of the opening 184 in the retainer 182 is located on the axis A of the tubular housing 24. The opening 184 has a diameter D5 which is smaller than the outer diameter D3 of the movable section 146 and larger than the diameter D4 of the vent opening 162. The opening 184 provides an outlet through which the combustion products CP in the combustion chamber 166 can flow and enter the movable section 146 of the ignition cup 122. The retainer 182 has an outer periphery 186 (FIG. 1) which engages an inner surface 190 of the ignition cup 122 to add strength to base section 142 of the ignition cup 122 at the shoulder 188.

A thin metal foil 200 is attached to the radially extending end surface 202 of the mounting portion 140. The foil 200 closes and isolates the ignitable propellant 168 and the inflation fluid in the chamber 44 from the environment which surrounds the container 22 and which could enter the inflator 20 through the end wall 26. An elastomeric cushion 204 is provided between the ignitable propellant 168 and the foil 200. The cushion 204 is compressed against the foil 200 and the end surface 202 of the mounting portion 140 when the annular shoulder 188 of the ignition cup 122 is moved against the retainer 182 during assembly of the flow initiator 120.

The flow initiator 120 further includes an actuatable igniter 222 that is supported in a chamber 224 in the mounting portion 140 of the end wall 26. The igniter 222 is located on the axis A of the container 22 and is held against a seal 226 in the end wall 26 by a mounting member 228. The mounting member 228 is held in place in the end wall 26 by a portion 240 of the end wall which is deformed to engage a flange 242 on the mounting member 228. The igniter 222 has an end surface 244 which is spaced from the foil 200 and the tubular ignitable propellant 168 along the axis A. It will be apparent, however, that the end surface 244 of the igniter 222 may be located inside of the ignitable propellant 168.

The igniter 222 of the flow initiator assembly 120 is electrically connected to a controller (not shown). The controller is electrically connected to a collision sensor (not shown). When the collision sensor communicates a signal to the controller indicating that a collision has started and the controller determines that inflation of the air bag is required, the controller triggers actuation of the igniter 222.

In operation, when the igniter 222 is energized, combustion products I, including pressure, heat and hot particles, are produced in the chamber 224, as illustrated in FIG. 2. The combustion products I rupture the foil 200 and then contact and ignite the propellant 168 in the base section 142 of the ignition cup 122.

The propellant 168, upon ignition, produces combustion products CP, which are communicated to the interior of the ignition cup 122. The pressure inside the portion of the ignition cup 122 having the reduced diameter D3 quickly increases without a corresponding increase in the pressure outside the ignition cup because of the relatively small diameter D4 of the vent opening 162. Forces F (FIG. 2) act on the end wall 164 of the ignition cup 122 and cause the stress riser 160 in the frangible section 148 of the ignition cup to break. The movable section 146 then separates from the base section 142.

The pressure of the combustion products CP propels the movable section 146 to strike and rupture the closure 102, as illustrated in FIG. 3. After the closure 102 ruptures, the inflation fluid IF is free to flow from the chamber 44 through the opening 60 in the container 22, into the diffuser 80, through the diffuser openings 82 and into the air bag. The end wall 164 of the movable section 146 strikes the diffuser 80 and further movement of the movable section to the right is prevented by the diffuser 80, as viewed in FIG. 3. When the end wall 164 of the movable section 146 is spaced from the diffuser 80, inflation fluid may also flow through the vent opening 162.

The initial flow of the inflation fluid IF from the chamber 44 through the opening 60 is relatively slow. The initial flow of the inflation fluid IF results primarily from the pressure of the inflation fluid in the chamber 44. When the movable section 146 is located in the opening 60 in the container 22, the flow of inflation fluid is restricted.

The ignitable material 168 continues to burn and the combustion products CP are directed through the opening 184 in the retainer 182 into the inflation fluid still in the chamber 44. The combustion products CP heat the inflation fluid in the chamber 44. Heating the inflation fluid causes the pressure of the inflation fluid remaining in the chamber 44 to increase. The flow of the inflation fluid IF through the opening 60 is correspondingly increased to a relatively rapid rate and provides an accelerated pressure increase in the air bag as a function of time.

The diameter D4 of the vent opening 162 is sufficiently large to equalize the pressure inside and outside the ignition cup 122 as the chamber 44 is initially filled with inflation fluid. This pressure equalization assures that the ignition cup 122, especially the movable section 146, will not collapse under the pressure of the inflation fluid in the chamber 44 which acts on the ignition cup. The diameter D4 of the vent opening 162 is also small enough to limit flow of combustion products from the ignition cup 122 upon ignition of the propellant 168. This limited flow assures that the pressure of the combustion products inside the ignition cup 122 is great enough to reach a predetermined pressure which breaks the stress riser 160 in the frangible section 148.

The relatively thin wall thickness T of about 0.020 inch of the ignition cup 122 is possible because the vented ignition cup 122 is used in the inflator 20. The vented ignition cup 122 is used instead of a typical non-vented ignition cup located in the inflation fluid storage chamber 44. The non-vented ignition cup typically has a wall thickness of about 0.060 inch. The relatively thicker walls of a non-vented ignition cup are necessary to withstand the pressure of the inflation fluid acting on the exterior surfaces of the non-vented ignition cup with no offsetting fluid pressure on the interior surfaces of the cup. The relatively thinner wall of the vented ignition cup 122 also minimizes the mass of the movable section 146 which strikes the diffuser 80. Thus the diffuser 80 does not have to be made from a material that is relatively thicker and/or stronger in order to withstand being struck by the movable section 146. A further advantage is that a relatively larger volume of inflation fluid can be stored in the chamber 44 at a given pressure because the volume inside the vented ignition cup 122 contains inflation fluid.

Figure 4:
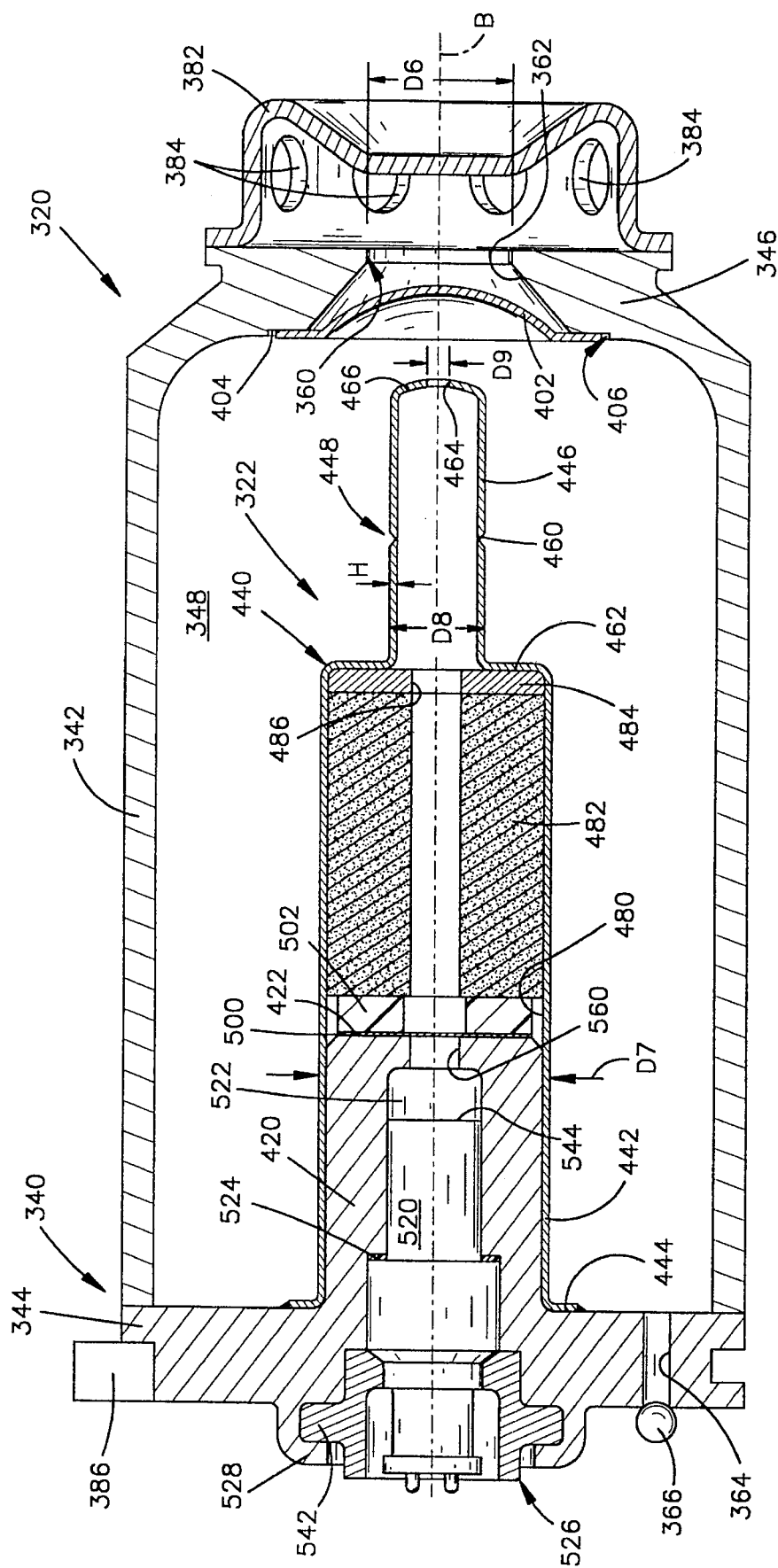
FIG. 4 is a schematic view of an inflator according to another embodiment of the present invention.

An inflator 320, according to another embodiment of the present invention, is illustrated in FIG. 4. The inflator 320 includes a flow initiator 322. The structure of the inflator 320 is similar to the structure of the inflator 20, illustrated in FIGS. 1–3 and described above. The operation of the inflator 320 is identical to the operation of the inflator 20, illustrated in FIGS. 1–3 and described above. The structure and operation of the inflation fluid heating device 322 are similar to the structure and operation of the inflation fluid heating device 120, illustrated in FIGS. 1–3 and described above.

The inflator 320 includes a container 340 which has a metal housing 342 with a longitudinal central axis B. The container 340 also includes a pair of metal end walls 344, 346. The left end wall 344, as viewed in FIG. 4, is fixed to a left end of the housing 342. The right end wall 346 is integrally formed as part of the housing 342.

When the housing 342 and the left end wall 344 are fixed together, they define a chamber 348. The chamber 348 stores an inflation fluid for inflating an air bag. The inflation fluid preferably is an inert gas, such as argon or nitrogen, or a combination of inert gases. The inflation fluid is stored in the chamber 348 at a first pressure which is at least about 2,000 psi, and preferably about 4,500 psi.

The right end wall 346 of the container 340 has an opening 360 with a center that is located along the axis B. The opening 360 has a portion 362 which is frustoconical in shape and oriented such that a portion of the opening having the smallest diameter D6 is located away from the chamber 348. The opening 360 permits flow of the inflation fluid from the chamber 348 to a location outside of the container 340. The left end wall 344 of the container 340 has a fill port 364. The fill port 364 is sealed by a ball 366 welded to the left end wall 344.

A cup-shaped diffuser 382 is welded to the right end wall 346 of the container 340 and surrounds the opening 360. The diffuser 382 includes a plurality of circular openings 384 which direct the flow of inflation fluid radially outward relative to the axis B. The openings 384 are arranged in a circumferential array about the diffuser 382. A slot 386 in the left end wall 344 permits mounting and orientation of the inflator 320 in attachment structure (not shown) of an air bag module.

A rupturable closure 402 is fixed to an annular shoulder 404 in a recess 406 in the right end wall 346. The shoulder 404 and recess 406 are located coaxially about the opening 360. The closure 402 initially blocks the flow of inflation fluid from the chamber 348 through the opening 360 when the closure is unruptured.

The closure 402 may rupture in response to the pressure of the inflation fluid in the chamber 348 increasing to a predetermined pressure, which is greater than the pressure at which the inflation fluid is stored. The closure 402 may also rupture when forcefully struck by a part of the flow initiator 322 moving inside the chamber 348. When the closure 402 is ruptured, the inflation fluid flows from the chamber 348, through the opening 360 and into the diffuser 382 for inflating the air bag. After the closure 402 ruptures, the "petals" of the ruptured closure engage and are supported by the frustoconical portion 362 of the opening 360.

The flow initiator 322 is located in the chamber 348 axially opposite the opening 360 of the container 340 and the closure 402. The flow initiator 322 is actuatable in response to a condition being detected which requires inflation of the air bag. Upon actuation, the flow initiator 322 causes the closure 402 to rupture and heats the inflation fluid in the chamber 348. Heating the inflation fluid in the chamber 348 increases the pressure of the inflation fluid which helps in forcing the inflation fluid to flow from the chamber.

The flow initiator 322 is supported by the left end wall 344 of the container 340 and is spaced from the closure 402. The left end wall 344 includes a tubular mounting portion 420 located along the axis B of the container 340. The mounting portion 420 projects into the chamber 348 and has an annular, radially extending end surface 422.

The flow initiator 322 includes an ignition cup 440. The ignition cup 440 is supported on the mounting portion 420 of the left end wall 344. The longitudinal central axis of the ignition cup 420 is coaxial with the axis B of the container 340. The ignition cup 420 is preferably made from a drawn stainless steel or low carbon steel and has a substantially uniform thickness H of no greater than about 0.040 inch (1.0 mm), and preferably approximately 0.020 inch (0.5 mm).

The ignition cup 440 includes a tubular base section 442 which is closely fitted over the mounting portion 420 for lateral support. A flange 444 extends radially outward from an end of the base section 442 and is welded to the left end wall 344. The ignition cup 440 also includes a tubular movable section 446 connected to the base section 442 at a frangible section 448. The frangible section 448 of the ignition cup 440 has a circumferentially extending stress riser 460. The stress riser 460 is a thin wall portion of the ignition cup 440 which extends circumferentially around the ignition cup.

The base section 442 of the ignition cup 440 has an outer diameter D7 throughout most of its length, measured normal to the longitudinal central axis of the ignition cup. Near the movable section 446, however, the base section 442 has a shoulder 462 that extends radially inward to a smaller diameter portion of the base section with an outer diameter D8, measured normal to the longitudinal central axis of the ignition cup 440, and which is less than the outer diameter D7. A portion of the base section 442 having the reduced outer diameter D8 and which is located to the right of the shoulder 462, as viewed in FIG. 4, transitions into the movable section 446 at the frangible section 448. The outer diameter D8 of the movable section 446 is less than the diameter D6 of the opening 360.

A vent opening 464 is located in a radially extending end wall 466 of the movable section 446. The vent opening 464 is circular and has a center located on the axis B of the container 340. The vent opening 464 has a diameter D9. The diameter D9 of the vent opening 464 is in the range of about 0.040 inch (1 mm) to about 0.200 inch (5 mm), and is preferably about 0.080 inch (2 mm). The vent opening 464 allows fluid communication between the interior and the exterior of the ignition cup 440. Thus, the pressure of the inflation fluid in the chamber 348 acting on internal and external surfaces of the ignition cup 440 can equalize.

The flow initiator 322 includes a combustion chamber 480 which is located primarily within the base section 442 of the ignition cup 440 between the end surface 422 of the mounting portion 420 and the shoulder 462 of the base section. An ignitable propellant 482, such as potassium perchlorate, is located in the combustion chamber 480. The propellant 482 is tubular and, upon ignition, produces combustion products, including heat and pressure.

The flow initiator 322 also includes an annular metal retainer 484 in the base section 442 of the ignition cup 440 which engages the ignitable propellant 480. The retainer 484 also engages the shoulder 462 of the base section 442 of the ignition cup 440. The retainer 484 has an outer periphery which engages an inner surface of the ignition cup 440 to add strength to base section 442 of the ignition cup at the shoulder 462. A circular opening 486 is located centrally in the retainer 484. The opening 486 provides an outlet through which the combustion products in the combustion chamber 480 can flow and enter the portion of the ignition cup 440 having the reduced outer diameter D8.

A thin metal foil 500 is attached to the radially extending end surface 422 of the mounting portion 420. The foil 500 closes and isolates the ignitable propellant 482 and the inflation fluid in the chamber 348 from the environment which surrounds the container 340 and which could enter the inflator 320 through the left end wall 344. An elastomeric cushion 502 is provided between the ignitable propellant 482 and the foil 500. The cushion 502 is compressed against the foil 500 and the end surface 422 of the mounting portion 420 by the ignitable propellant 482 when the shoulder 462 of the ignition cup 440 is moved against the retainer 484 during assembly of the flow initiator 322.

The flow initiator 322 further includes an actuatable igniter 520 that is supported in a chamber 522 in the mounting portion 420 of the end wall 344. The igniter 520 is held against a seal 524 in the left end wall 344 by a mounting member 526 engaging and holding the igniter in the end wall. The mounting member 526 is held in place in the left end wall 344 by a portion 528 of the end wall which is deformed over a flange 542 on the mounting member 526. The igniter 520 has an end surface 544 in the chamber 522 and which is spaced from the foil 500 and the ignitable propellant 482.

When the igniter 520 is energized, initiating combustion products, including pressure, heat and hot particles, are produced in the chamber 522. The initiating combustion products flow through an opening 560 in the end surface 422 of the mounting portion 420, rupture the foil 500 and then contact and ignite the propellant 482 in the combustion chamber 480 in the base section 442 of the ignition cup 440.

The propellant 482, upon ignition, produces combustion products, which are communicated from the combustion chamber 480, through the opening 486 in the retainer 484 to the interior of the portion of the ignition cup 440 having the reduced outer diameter D8. The pressure inside the portion of the ignition cup 440 having the reduced outer diameter D8 quickly increases. Forces act on the end wall 466 of the ignition cup 440 and cause the stress riser 460 in the frangible section 448 of the ignition cup to break. The movable section 446 of the ignition cup 440 then separates from the base section 442.

The pressure of the combustion products propels the movable section 446 along the axis B in a direction away from the base section 442 to forcefully strike and rupture the closure 402. After the closure 402 ruptures, the inflation fluid is free to flow from the chamber 348 through the opening 360 in the container 340, into the diffuser 382, through the diffuser openings 384 and into the air bag. The end wall 466 of the movable section 446 engages the diffuser 382 and further movement of the movable section along the axis B away from the base section 442 is prevented by the diffuser.

The ignitable material 482 continues to burn and the combustion products are directed into the inflation fluid still in the chamber 348. Heating the inflation fluid in the chamber 348 causes the pressure of the inflation fluid remaining in the chamber to increase. The flow of the inflation fluid through the opening 360 thus correspondingly increases to a relatively rapid rate and provides an accelerated pressure increase in the air bag as a function of time.

The diameter D9 of the vent opening 464 is sufficiently large to equalize the pressure inside and outside the ignition cup 440 as the chamber 348 is initially filled with inflation fluid. This pressure equalization assures that the ignition cup 440, especially the movable section 446, will not collapse under the pressure of the inflation fluid in the chamber 348 which acts on the ignition cup. The diameter D9 of the vent opening 464 is also small enough to limit flow of combustion products from within the ignition cup 440 upon ignition of the propellant 482. This limited flow assures that the pressure of the combustion products inside the ignition cup 440 is great enough to reach a predetermined pressure which breaks the stress riser 460 in the frangible section 448.

From the above description of the invention, those skilled in the art will perceive improvements, changes and modifications. Such improvements, changes and modifications within the skill of the art are intended to be covered by the appended claims.

Having described the invention, the following is claimed:

1. An apparatus for inflating an inflatable vehicle occupant protection device, said apparatus comprising:

a container defining a chamber for storing inflation fluid under pressure, said container having an opening through which inflation fluid flows to inflate the protection device;

a rupturable closure extending across the opening in said container to block the flow of inflation fluid through the opening; and a flow initiator located in the chamber, said flow initiator comprising:

an ignition cup having a base section fixed to said container and a movable section attached to said base section, said movable section being separable from said base section, said movable section having a vent which permits communication of the inflation fluid in the chamber with the interior of said ignition cup;

an ignitable propellant located in said ignition cup; and an actuatable igniter to ignite, upon actuation, said propellant to produce combustion products including pressure which acts on interior surfaces of said movable section to separate said movable section from said base section and propel said movable section to engage and rupture said closure.

2. The apparatus of claim 1 wherein the vent is located in an end wall of said movable section of said ignition cup.

3. The apparatus of claim 1 wherein the vent has a size which is large enough to permit pressure equalization between the inside and outside of said ignition cup over a time interval and which is small enough to allow a rapid pressure increase within said ignition cup sufficient to separate said movable section from said base section.

4. The apparatus of claim 1 wherein said base section and said movable section are tubular and coaxial.

5. The apparatus of claim 4 wherein said movable section has a first extent in a direction normal to the axis of said ignition cup and said base section has a second extent in a direction normal to the axis of said ignition cup, the second extent being greater than the first extent.

6. The apparatus of claim 1 further including a diffuser fixed to said container and surrounding the opening in said container, said diffuser limiting movement of said movable section in one direction after said movable section is propelled through said closure.

7. The apparatus of claim 1 wherein the flow of the inflation fluid from the chamber is initially due to the pressure of the inflation fluid stored in the chamber and is restricted by said movable section being located in the opening in said container.

8. The apparatus of claim 1 wherein walls of said movable section of said ignition cup have a thickness no greater than 1.0 mm.

9. An apparatus for inflating an inflatable vehicle occupant protection device, said apparatus comprising:

a container defining a chamber for storing inflation fluid under pressure, said container having an opening through which inflation fluid flows from the chamber to inflate the protection device;

a rupturable closure extending across the opening in said container to block the flow of inflation fluid through the opening; and a flow initiator located in the chamber and spaced from said closure, said flow initiator comprising:

an ignition cup having a base section fixed to said container and a movable section attached to said base section, said movable section being separable from said base section, said ignition cup having a vent to equalize pressure of the inflation fluid acting on interior and exterior surfaces of the ignition cup;

an ignitable propellant located in said ignition cup; and an actuatable igniter to, upon actuation, ignite said propellant to produce combustion products including heat and pressure, the pressure acting on an interior surface of said movable section separating said movable section from said base section to propel said movable section to engage and rupture said closure, the heat pressurizing the inflation fluid in the chamber.

10. The apparatus of claim 9 wherein the vent is located in an end wall of said movable section of said ignition cup.

11. The apparatus of claim 9 wherein said base section and said movable section are tubular and coaxial.

12. The apparatus of claim 11 wherein said movable section has a first extent in a direction normal to the axis of said ignition cup and said base section has a second extent in a direction normal to the axis of said ignition cup, the second extent being greater than the first extent.

13. The apparatus of claim 9 further including a diffuser fixed to said container and surrounding the opening in said container, said diffuser limiting movement of said movable section in one direction after said movable section is propelled through said closure.

14. An apparatus for inflating a vehicle occupant protection device, said apparatus comprising:

a container defining a chamber for storing inflation fluid under pressure, said container including a tubular housing and a pair of axially opposite end walls, a first one of said end walls having an opening through which inflation fluid flows from the chamber to inflate the protection device;

a rupturable closure extending across the opening in said first end wall of said container, and a flow initiator supported by a second one of said end walls, said flow initiator being located in the chamber and spaced from said closure, said flow initiator comprising:

a tubular ignition cup including a first portion having a first diameter and a second portion having a second diameter less than the first diameter, a base section of said ignition cup includes said first portion and part of said second portion and is fixed to said second end wall, a movable section of said ignition cup includes another part of said first portion and is connected to said base section at a frangible section located in said first portion, said movable section being separable from said base section in response to a predetermined pressure increase in said ignition cup;

a retainer within said ignition cup in engagement with an inner surface of said base section to support base section, said retainer having an opening for inflation fluid to flow through;

an ignitable propellant located in said base section; and an actuatable igniter supported by said second end wall and having an end portion surrounded by said base section;

said igniter, upon actuation, igniting said propellant to produce combustion products including pressure which flow through the opening in said retainer and act on an interior surface of said movable section to break said frangible section and separate said movable section from said base section and to propel said movable section to engage and rupture said closure.

15. The apparatus of claim 14 further including a vent located in said movable section of said ignition cup.

16. The apparatus of claim 15 wherein the vent has a size which is large enough to permit pressure equalization between the inside and outside of said ignition cup over a time interval and which is small enough to allow the pressure in said ignition cup to rapidly increase to the predetermined pressure for breaking said frangible section.

17. The apparatus of claim 14 wherein said frangible section, said movable section and said base section are coaxial.

18. The apparatus of claim 14 further including a diffuser fixed to said container and surrounding the opening in said container, said diffuser limiting movement of said movable section in one direction after said movable section is propelled through said closure.

* * * * *